(12) United States Patent
Watson et al.

(10) Patent No.: US 11,061,047 B2
(45) Date of Patent: Jul. 13, 2021

(54) SYSTEMS AND METHODS FOR DETERMINING MEASUREMENT CHARACTERISTICS OF AN OBJECT WITH A TIME DISPLACEMENT SENSOR

(71) Applicant: TOYOTA MOTOR ENGINEERING & MANUFACTURING NORTH AMERICA, INC., Plano, TX (US)

(72) Inventors: Skylar C. Watson, Williamston, MI (US); Scott M. Gordon, Trenton, MI (US); Zachary T. Pawson, Deerfield, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 159 days.

(21) Appl. No.: 16/367,451

(22) Filed: Mar. 28, 2019

(65) Prior Publication Data

US 2020/0309807 A1 Oct. 1, 2020

(51) Int. Cl.
*G01R 27/26* (2006.01)
*G01P 3/66* (2006.01)

(52) U.S. Cl.
CPC .................................. *G01P 3/66* (2013.01)

(58) Field of Classification Search
CPC ................ G01R 31/2829; G01R 27/26; G01R 27/2635; G01R 29/0878; G01P 3/66
See application file for complete search history.

(56) References Cited

U.S. PATENT DOCUMENTS

| 3,612,990 A | * | 10/1971 | Del Duca | G01N 27/74 324/204 |
| 4,587,850 A | | 5/1986 | Moser | |
| 5,450,005 A | * | 9/1995 | Peterson, Jr. | G01R 15/165 324/452 |
| 5,585,733 A | | 12/1996 | Paglione | |
| 7,131,512 B2 | * | 11/2006 | Aoki | B60R 21/0136 180/271 |
| 2003/0009270 A1 | * | 1/2003 | Breed | B60N 2/2863 701/32.4 |
| 2014/0352648 A1 | | 12/2014 | Weisser et al. | |

FOREIGN PATENT DOCUMENTS

WO   WO-2011024202 A2 * 3/2011 ............. B60R 19/18

* cited by examiner

*Primary Examiner* — Jermele M Hollington
*Assistant Examiner* — Taqi R Nasir
(74) *Attorney, Agent, or Firm* — Haynes and Boone, LLP

(57) ABSTRACT

A sensor for measuring displacement and time comprises a hollow body including a longitudinal axis. The hollow body comprises a wall including an inner surface and an outer surface, and a pathway defined by the inner surface. The sensor further comprises a solid body including an outer surface, the solid body configured to be received by the hollow body and travel through the pathway. The sensor further comprises a plurality of frangible wires, where each wire of the plurality of wires extends through a first opening in the wall, across the pathway, and through a second opening in the wall, and each wire is spaced apart by a distance in a direction generally parallel to the longitudinal axis of the hollow body.

20 Claims, 3 Drawing Sheets

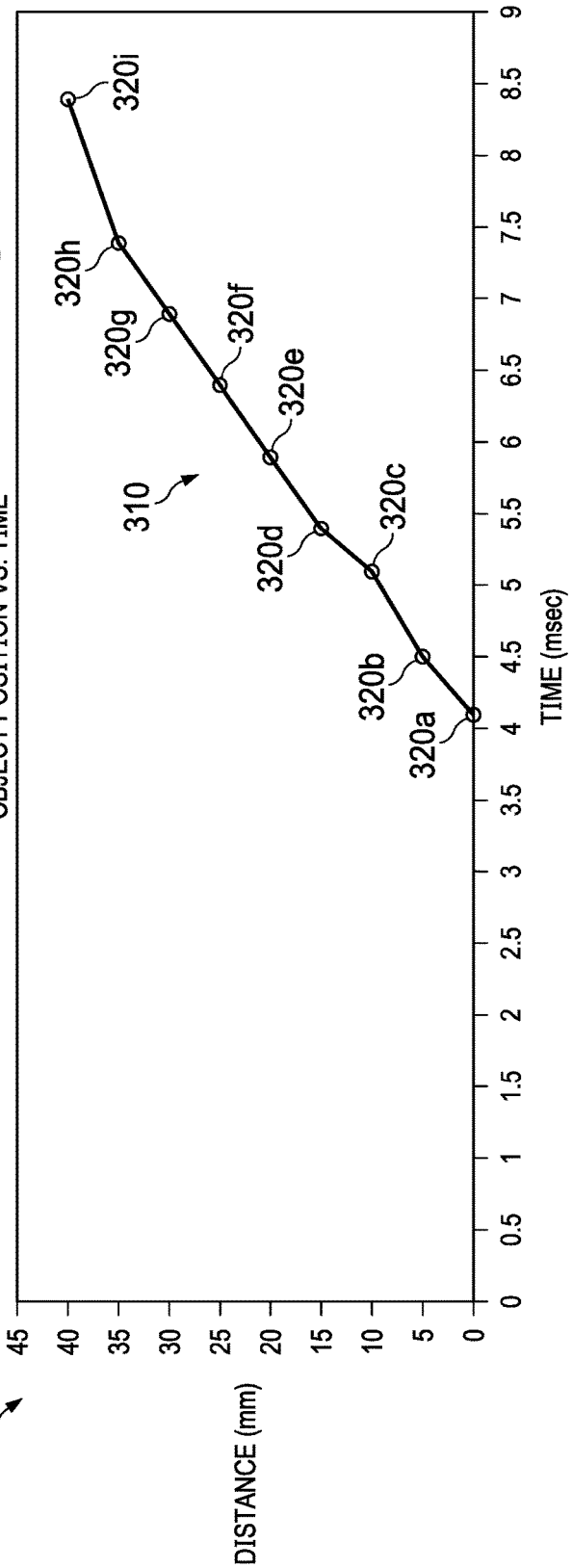
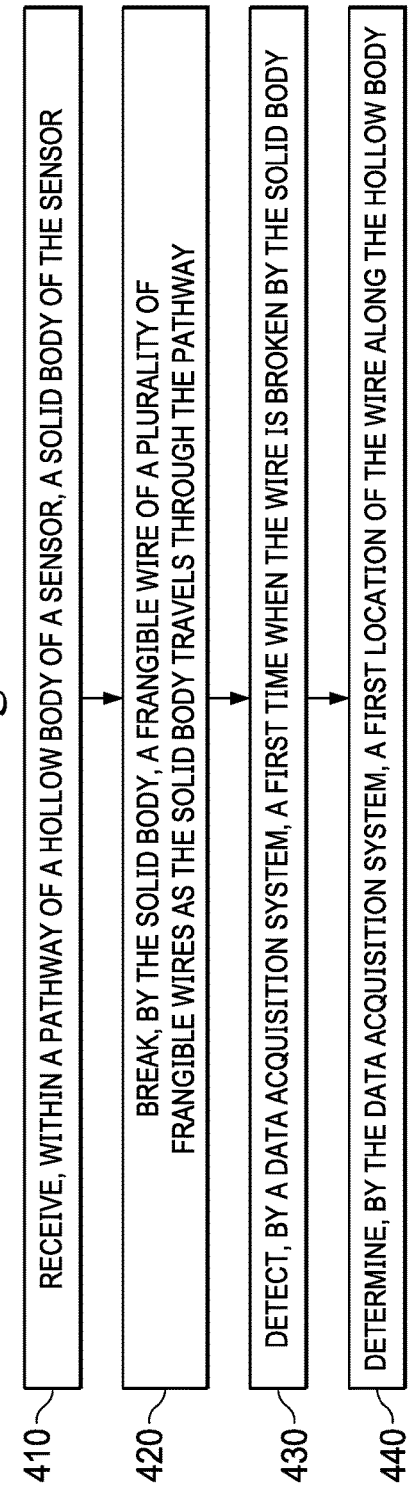

SYSTEMS AND METHODS FOR DETERMINING MEASUREMENT CHARACTERISTICS OF AN OBJECT WITH A TIME DISPLACEMENT SENSOR

TECHNICAL FIELD

The present disclosure relates generally to determining measurement characteristics of an object and, more particularly, to determining the displacement of an object using a time displacement sensor.

BACKGROUND

Sensors are commonly used to measure certain parameters, such as displacement. However, existing displacement sensors lack the ability to measure an unlimited range of displacements with an unlimited range of displacement resolution. Furthermore, existing displacement sensors may be further limited by the temperature range at which they can operate. This can limit the operational use of these existing displacement sensors. A more reliable, cost-effective method is needed to measure displacement, and other measurement characteristics, of an object. It would therefore be desirable to enable a sensor to measure characteristics, such as displacement, irrespective of temperature effects and displacement ranges. Therefore, what is needed is an apparatus, system, and/or method that addresses one or more of the foregoing issues, and/or one or more other issues.

SUMMARY

The present disclosure provides systems and methods for determining measurement characteristics of an object (e.g., displacement, acceleration, velocity, force, etc.) using a time displacement sensor. A generalized sensor for measuring displacement and time includes a hollow body including a longitudinal axis. The hollow body includes a wall including an inner surface and an outer surface. The hollow body further includes a pathway defined by the inner surface. The sensor further includes a solid body including an outer surface, and the solid body is configured to be received by the hollow body and travel through the pathway. The sensor further includes a plurality of frangible wires, where each wire of the plurality of wires extends through a first opening in the wall, across the pathway, and through a second opening in the wall. Each wire is spaced apart by a distance in a direction generally parallel to the longitudinal axis of the hollow body.

A generalized system for measuring displacement and time includes a sensor. The sensor includes a hollow body including a longitudinal axis. The hollow body includes a wall including an inner surface and an outer surface. The hollow body further includes a pathway defined by the inner surface. The sensor further includes a solid body configured to be received by the hollow body and travel through the pathway. The sensor further includes a plurality of frangible wires, where each wire of the plurality of wires extends across the pathway. Each wire is spaced apart by a distance in a direction generally parallel to the longitudinal axis of the hollow body. The system further includes a data acquisition system in communication with the plurality of wires of the sensor. The data acquisition system includes a processor configured to detect a first time when a first wire of the plurality of wires is broken by the solid body as the solid body travels through the pathway. The processor is further configured to detect a second time when a second wire of the plurality of wires is broken by the solid body as the solid body travels through the pathway.

A generalized method for measuring displacement and time includes receiving, within a pathway of a hollow body of a sensor, a solid body of the sensor. The method further includes breaking, by the solid body, a frangible wire of a plurality of frangible wires as the solid body travels through the pathway. The method further includes detecting, by a data acquisition system, a first time when the wire is broken by the solid body. The method further includes determining, by the data acquisition system, a first location of the wire along the hollow body.

BRIEF DESCRIPTION OF THE DRAWINGS

FIG. 3 is a graphical illustration of an operational performance of the system of FIGS. 1 and 2 according to one or more embodiments of the present disclosure.

FIG. 4 is a flow chart illustration of a method of operating the system of FIGS. 1 and 2 according to one or more embodiments of the present disclosure.

DETAILED DESCRIPTION

Figure 1:
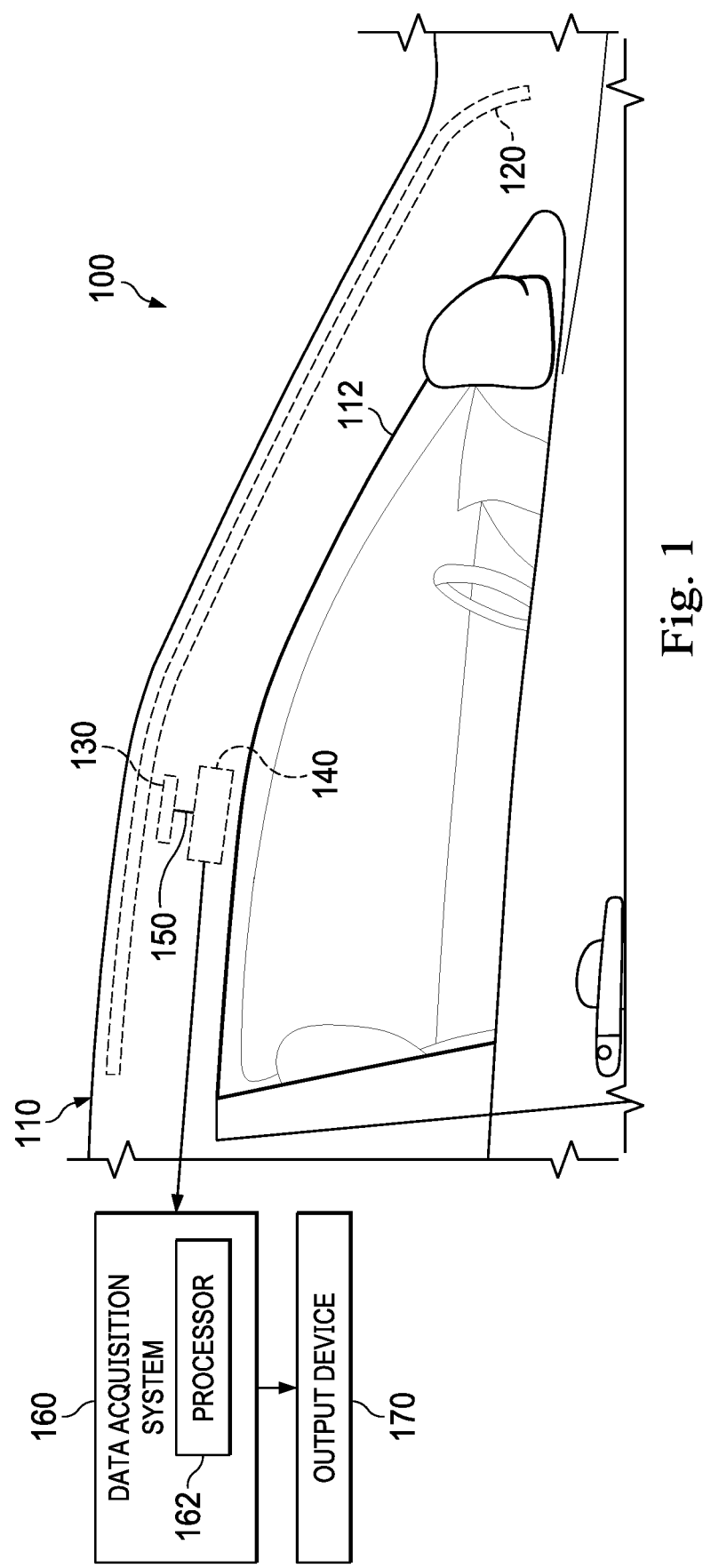
FIG. 1 is a diagrammatic illustration of a system for measuring displacement and time of an object according to one or more embodiments of the present disclosure.

For the purposes of promoting an understanding of the principles of the invention, reference will now be made to certain implementations, or examples, illustrated in the drawings, and specific language will be used to describe the same. It will nevertheless be understood that no limitation of the scope of the invention is thereby intended. Any alterations and further modifications in the described implementations, and any further applications of the principles of the invention as described herein are contemplated as would normally occur to one skilled in the art to which the invention relates.

This disclosure describes a system for measuring displacement and time. In the system, a sensor is used to measure the displacement of one object relative to another object. The sensor includes a hollow body including a longitudinal axis. The hollow body includes a wall with an inner surface and an outer surface, and the inner surface defines a pathway. Additionally, the sensor includes a solid body that travels within the pathway of the hollow body. The sensor also includes a plurality of frangible wires. Each wire extends across the pathway in a direction generally perpendicular to the longitudinal axis of the hollow body. As the solid body travels within the pathway, the solid body contacts one or more of the wires. The solid body breaks each wire that the solid body contacts. Each of the wires is equidistantly spaced in a direction generally parallel to the longitudinal axis of the hollow body. The system further includes a data acquisition system that includes a processor. The processor determines a location of each of the wires from an initial position of the solid body. The solid body may be in the initial position when the solid body abuts a wire closest to a proximal end of the hollow body of the sensor. The processor also determines a time when each wire is broken by the solid body. From this information, the processor can determine the displacement of the solid body relative to the hollow body, along with other measurement characteristics of the solid body (e.g., velocity, acceleration, force, etc.). These measurement characteristics may be displayed by an output device of the system. It is an advantage of the system that the sensor may function without being affected by temperatures, even extreme temperatures. It is a further advantage of the system that the sensor can be used to measure any desired displacement at any desired displacement resolution.

FIG. 1 is a diagrammatic illustration of a system for measuring displacement and time of an object according to one or more embodiments of the present disclosure. In at least one such embodiment, as illustrated in FIG. 1, the system is generally referred to by the reference numeral 100 and includes a vehicle 110, a data acquisition system 160, and an output device 170. In the embodiment of FIG. 1, the vehicle 110 includes a window 112, an airbag 120, an air vent 130 (which may be a vent register), a sensor 140 (which may be a time displacement sensor), and a connecting member 150. In the embodiment of FIG. 1, the vehicle 110 is an automobile. It is to be understood that the vehicle 110 may be a car or any other type of suitable automobile (e.g., a pickup truck, a semi truck, a fleet vehicle, etc.). In several embodiments, the connecting member 150 connects the air vent 130 to the sensor 140. The connecting member 150 may be coupled to the air vent 130 by a mechanical connection, an adhesive connection, or any other suitable connection. The connecting member 150 may be connected to the sensor 140 in a similar manner (e.g., by a mechanical connection, an adhesive connection, or any other suitable connection).

The sensor 140 is operably coupled to, and adapted to be in communication with, the data acquisition system 160. The data acquisition system 160 is operably coupled to, and adapted to be in communication with, the output device 170. In some embodiments, the data acquisition system 160 includes a processor 162. In some embodiments, the processor 162 receives data from the sensor 140 and analyzes the data, which will be described in further detail below. The output device 170 communicates information from the sensor to a user, and may include one or more of a graphical display (e.g., a display screen, a user interface, etc.) and/or an audio system, which may include a speaker. The output device 170 presents the data from the sensor 140 to a user, which will be described in further detail below.

In several embodiments, when the airbag 120 (which may be a curtain shield airbag) expands, such as when the vehicle 110 is involved in a collision, the airbag 120 displaces the air vent 130. It may be beneficial to determine the displacement of the air vent 130 in the event of expansion of the airbag 120. In some embodiments, it may be useful to determine how far the air vent 130 moves relative to a window mount, for example. This may provide beneficial information during the design phase of the vehicle 110 so that the air vent 130 can be positioned in a location that does not interfere with the expansion of the airbag 120 and also does not injure a passenger of the vehicle 110 when the airbag 120 expands. The sensor 140, in conjunction with the data acquisition system 160, may be used to measure the displacement of the air vent 130, which will be discussed in further detail below. While the following discussion will be made with reference to the vehicle 110 and with measuring the displacement of the air vent 130, it is to be understood that the sensor 140 may be used to measure the displacement of any object, whether the object is located in a vehicle or not.

Figure 2:
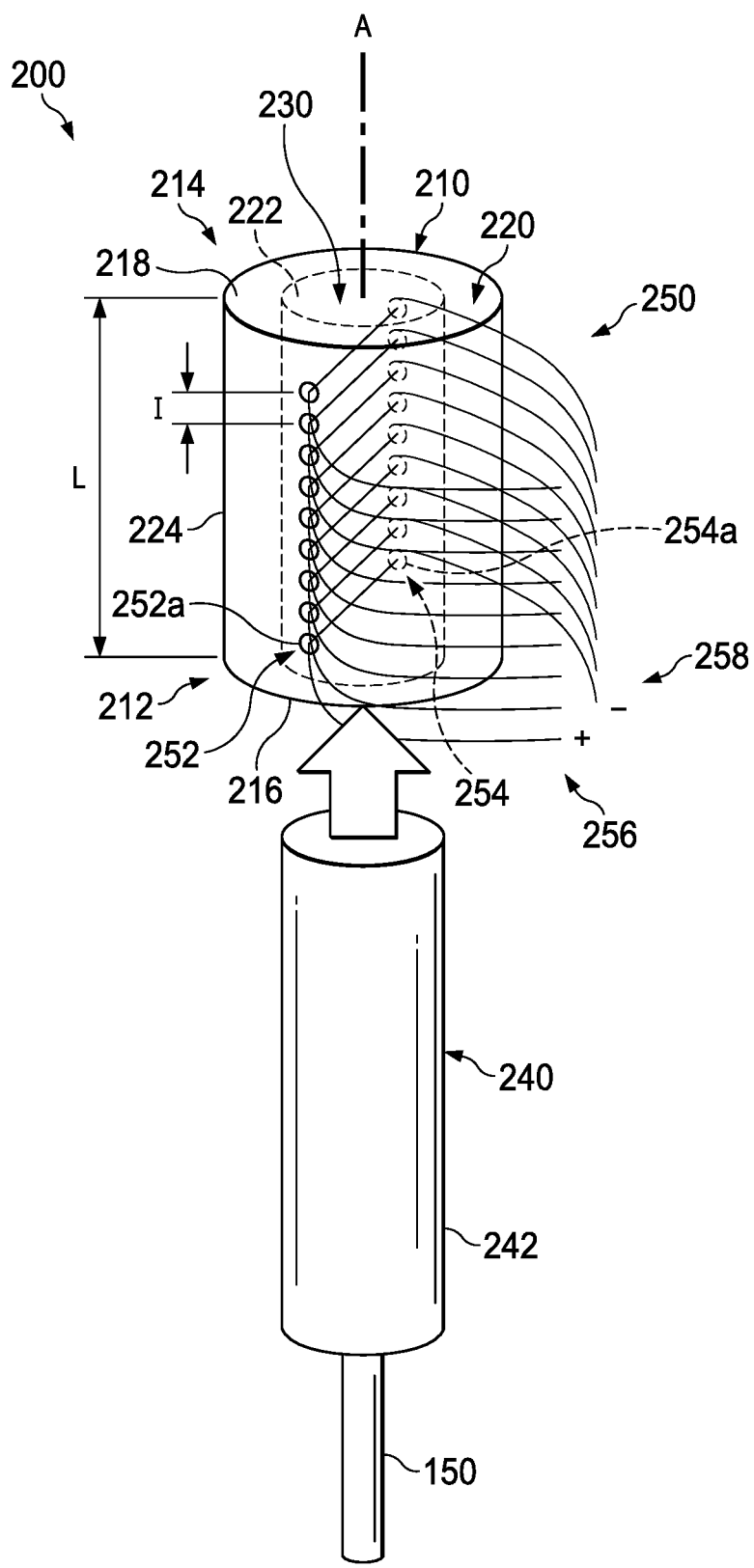
FIG. 2 is a diagrammatic illustration of a sensor for measuring displacement and time according to one or more embodiments of the present disclosure.

FIG. 2 is a diagrammatic illustration of a sensor for measuring displacement and time according to one or more embodiments of the present disclosure. In at least one such embodiment, as illustrated in FIG. 2, the sensor 200 may represent the sensor 140 in FIG. 1. In several embodiments, the sensor 200 is a time displacement sensor. In the embodiment shown in FIG. 2, the sensor 200 includes a hollow body 210, a solid body 240, and a plurality of frangible wires 250. In some embodiments, the solid body 240 may be coupled to a first object that will be displaced, and the hollow body 210 may be coupled to a second object to which relative displacement of the first object will be measured. For example, the solid body 240 may be coupled to the air vent 130, and the hollow body 210 may be coupled to a window mount. In several embodiments, the hollow body 210 and the solid body 240 may be non-conductive materials. In such embodiments, the connecting member 150 may also be a non-conductive material.

In some embodiments, the hollow body 210 includes a longitudinal axis A, a proximal portion 212, a distal portion 214, a proximal surface 216, a distal surface 218, and a wall 220, which includes an inner surface 222 and an outer surface 224. The inner surface 222 of the wall 220 defines a pathway 230 that extends from the proximal portion 212 to the distal portion 214 of the hollow body 210. The pathway 230 may by a cylindrical channel, a rectangular channel, or a channel of any other suitable geometry. In several embodiments, the shape of the pathway 230 matches the shape of the solid body 240. In alternative embodiments, the shape of the pathway 230 does not match the shape of the solid body 240. The hollow body 210 further includes a length L that extends between the proximal surface 216 and the distal surface 218 in a direction generally parallel to the longitudinal axis A of the hollow body 210. The length L may be any length. In several embodiments, the length L may range from 3.5 to 4 inches. The length provided herein is for example only, and other embodiments may include larger or smaller lengths. Therefore, the hollow body 210 may be any length as needed to measure the displacement of an object, which will be described in further detail below. The length L of the hollow body 210 may be chosen based on the estimated amount of displacement of the object that will be displaced. For example, the length L may be larger than the amount of displacement to allow the sensor 200 to measure the maximum amount of displacement. In the embodiment of FIG. 2, the hollow body 210 is open at the proximal and distal ends. In alternative embodiments, the hollow body 210 may be closed at the proximal end.

In several embodiments, the solid body 240 is sized to fit within the pathway 230 of the hollow body 210. In some embodiments, a diameter of the solid body 240 closely approximates a diameter of the pathway 230 such that when the solid body 240 travels within the pathway 230, there is little or no gap between the outer surface 242 of the solid body 240 and the inner surface 222 of the hollow body 210. In alternative embodiments, the diameter of the solid body 240 is less than the diameter of the pathway 230 such that when the solid body 240 travels within the pathway 230, there is a gap between the outer surface 242 of the solid body 240 and the inner surface 222 of the hollow body 210.

In some embodiments, the solid body 240 is coupled to the connecting member 150. The solid body 240 may be coupled to the connecting member 150 by a mechanical connection, an adhesive connection, or any other suitable connection. In several embodiments, when the connecting member 150 moves in a direction A1, which may be generally parallel with the longitudinal axis A of the hollow body 210, the movement of the connecting member 150 causes the solid body 240 to move in the direction A1. The solid body 240 may travel through the pathway 230 of the hollow body 210. The relative movement between the solid body 240 and the hollow body 210 may be used to determine the relative displacement of an object (e.g., the air vent 130). In some embodiments, the hollow body 210 is fixed at a location within the vehicle 110 (e.g., fixed in a global reference frame). In other embodiments, the hollow body 210 is fixed at a location relative to the solid body 240 (e.g., fixed in a sensor reference frame).

The hollow body 210 further includes a first plurality of openings 252 and a second plurality of openings 254. In several embodiments, the plurality of wires 250 extends through the first plurality of openings 252, across the pathway 230, and through the second plurality of openings 254. Each opening of the first plurality of openings 252 may be spaced apart by a distance I in a direction generally parallel to the longitudinal axis A of the hollow body 210. Similarly, each opening of the second plurality of openings 254 may be spaced apart by the distance I in a direction generally parallel to the longitudinal axis A of the hollow body 210. In some embodiments, the distance I may determine the resolution of the displacement measurement of the sensor 200. In one example, if the distance I is small, the resolution of the displacement measurement may be high. In another example, if the distance I is large, the resolution of the displacement measurement may be low. The distance I may change based on the size of the wires 250. In some examples, when the size of the wires 250 is small, the distance I may be small. In other examples, when the size of the wires 250 is large, the distance I may be large. In several embodiments, each wire of the plurality of wires 250 may be a 34-gauge wire. In other embodiments, each wire of the plurality of wires 250 may be a 36-gauge wire. In further examples, each wire of the plurality of wires 250 may be a 35-gauge wire. The wire gauges provided herein are for example only, and other embodiments may include wires of a lower or higher gauge.

In several embodiments, each opening of the first and second pluralities of openings 252, 254 may extend through the wall 220 of the hollow body 210 from the outer surface 224 to the inner surface 222. Each opening may be a cylindrical channel, a rectangular channel, or a channel of any other suitable geometry. In several examples, each opening in the second plurality of openings 254 corresponds to an opening in the first plurality of openings 252. In some embodiments, each opening in the second plurality of openings 254 is longitudinally aligned with a corresponding opening in the first plurality of openings 252 in a direction generally perpendicular to the longitudinal axis A of the hollow body 210. In some embodiments, each wire of the plurality of wires 250 extends through a separate opening of the first plurality of openings 252, across the pathway 230, and through a corresponding separate opening of the second plurality of openings 254. For example, a first wire, which may be a wire closest to the proximal surface 216 of the hollow body 210, extends into the hollow body 210 through the first opening 252a, across the pathway 230, and exits the hollow body 210 through the second opening 254a.

In some examples, each wire 250 is frangible. Therefore, as the solid body 240 travels within the pathway 230 in the direction A1, the solid body 240 breaks each wire that the solid body 240 contacts. The wires 250 may be sized such that when the solid body 240 contacts each wire, no extra force is needed to break the wires. Thus, the solid body 240 does not slow down as the solid body 240 breaks the wires 250 when traveling through the pathway 230. In several embodiments, each wire is tensioned after it is placed through the first and second openings 252, 254. In some embodiments, each wire is tensioned by wrapping the ends of each wire around external screws. The screws may be rotated, which then pulls the wires in tension. The wires 250 may be tensioned in any other suitable manner. Tensioning each wire may decrease the force required to break each wire, which may result in a more accurate displacement measurement.

As discussed above, in several embodiments, the distance I between the openings 252, for example, may determine the resolution of the displacement measurement. For example, as the solid body 240 travels through the pathway 230, the solid body 240 may break each wire that the solid body 240 contacts. In some embodiments, the distance of each wire from a starting position (e.g., the first wire, the proximal surface 216, etc.) may be known. Additionally, the processor 162 of the data acquisition system 160 may detect a time when each wire is broken by the solid body 240. If the distance I is small, more wires 250 can be included in the hollow body 210. Thus, more measurements may be received by the processor 162. Therefore, a more fine-tuned displacement measurement may be obtained. If the distance I is large, fewer wires 250 can be included in the hollow body 210. Thus, fewer measurements may be received by the processor 162. Therefore, a more general displacement measurement may be obtained. The distance I may be determined by the size of the wires 250, as discussed above. In some embodiments, the distance I may further be determined by the desired resolution of the displacement measurement. For example, if a general displacement measurement is acceptable, then a large distance I may be suitable.

In several embodiments, one end (e.g., an end 256) of each wire of the plurality of wires 250 is connected to a positive electrical terminal, and the other end (e.g., an end 258) of each wire of the plurality of wires 250 is connected to a negative electrical terminal. Therefore, each wire represents a completed circuit. The voltage of each wire (e.g., the voltage of each circuit) may be known. In some embodiments, as each wire is broken by the solid body 240, a signal change is recorded by the processor 162 of the data acquisition system 160. The signal change may indicate that the wire has been broken. In some embodiments, each individual wire is associated with an individual signal. In such embodiments, the signal for each wire may be a "1" when the circuit is complete (e.g., when the wire is unbroken) and a "0" when the circuit is broken (e.g., when the wire is broken). In alternative embodiments, the signal for each wire may be a "0" when the circuit is complete and a "1" when the circuit is broken. It is to be understood that the processor 162 may detect the signal change in any other suitable manner.

Additionally, the processor 162 may detect a time when each wire is broken. In some embodiments, the processor 162 may begin measuring time when the solid body 240 starts to move. In other embodiments, the processor 162 may begin measuring time when the first wire is broken by the solid body 240. In several embodiments, the solid body 240 is positioned right below the first wire before the object to which the solid body 240 is connected moves. In such embodiments, the solid body 240 may abut the first wire. In other embodiments, the starting point of the solid body 240 may be within the pathway 230 of the hollow body 210 but spaced from the first wire.

In some embodiments, the distance of each wire along the length of the hollow body 210 is known. For example, the first wire, which may be the wire closest to the proximal surface 216, may represent the initial position of the object that is being displaced. Because the distance I is known, the distance of each successive wire from the initial position may be known. For example, in embodiments where the distance I is 5 millimeters (mm), the second wire is 5 mm from the first wire. The third wire is then 5 mm from the second wire. Therefore, the third wire is 10 mm from the first wire. Each successive wire is 5 mm from the previous wire. Therefore, in such embodiments, the processor 162 may determine a time when each wire of the plurality of wires 250 is broken and a distance of the wire from the initial position when the wire is broken. From this information, the processor 162 may determine the displacement of the object relative to the hollow body 210 by determining the distance of the last wire that was broken by the solid body 240. This distance may be referred to as a displacement distance. For example, if the last wire to be broken was the sixth wire, then the processor 162 may determine that the displacement of the object relative to the hollow body 210 is between 25 and 30 mm. The distance I provided herein is for example only, and other embodiments may include shorter or longer distances between the wires 250. In several embodiments, the data acquisition system 160 may synthesize the received data and generate a graph illustrating the data.

FIG. 3 is a graphical illustration of an operational performance of the system of FIGS. 1 and 2 according to one or more embodiments of the present disclosure. As shown in FIG. 3, the graph 300 illustrates a position vs. time graph of exemplary data received by the processor 162 after the solid body 240 traveled within the pathway 230 of the hollow body 210 of the sensor 200. As shown in the embodiment of FIG. 3, the distance of the solid body 240 within the pathway 230 increased at a fairly steady rate, as indicated by the line 310. The line 310 connects the points 320a-320i, which represent the time and distance when each wire of the plurality of wires 250 was broken. For example, the first wire, represented by the point 320a, was broken just after 4 milliseconds from when the processor 162 started recording the time. In several embodiments, the first wire represents the initial position of the object that is being displaced. In such embodiments, before any displacement occurs, the solid body 240 abuts the first wire without breaking the first wire. Therefore, the first wire was broken at the initial position, which occurs at a distance of 0 millimeters.

The second wire, represented by the point 320b, was broken at about 4.5 milliseconds after the processor 162 started recording time. The difference between the time when the first wire was broken and the time when any successive wire is broken may be referred to as a displacement time. Thus, in the embodiment of FIG. 3, the displacement time between wires 1 and 2 is approximately 0.4 milliseconds. In the embodiment shown in FIG. 3, the distance I is 5 millimeters. Therefore, the second wire was broken at a distance of 5 millimeters from the initial position. As shown in FIG. 3, each successive wire is broken at successive 5 millimeter increments and at the times shown in the graph 300 (see points 320c-320i). In some embodiments, the processor 162 can analyze the data further and determine additional measurement characteristics of the object to which the solid body 240 is connected. For example, the processor 162 may determine the velocity, acceleration, force, or any other desired attribute of the object.

In some embodiments, the graph 300 is output from the data acquisition system 160 to the output device 170. The output device 170 may display the graph 300 to an operator or technician monitoring the sensor 200. For example, the graph 300 may be displayed on a display screen. In other examples, the graph 300 may be displayed on a user interface. Alternatively or additionally, the data from the graph 300 may be aurally output to the operator or technician through a speaker system of the output device 170.

FIG. 4 is a flow chart illustration of a method of operating the system of FIGS. 1 and 2 according to one or more embodiments of the present disclosure. In several embodiments, as discussed above, a sensor is used to measure the displacement of a first object relative to a second object. The sensor may be operable at extreme temperatures (e.g., −30° C. to 80° C., lower than −30° C., and higher than 80° C.). The sensor may also be used to measure any desired displacement at any desired displacement resolution. As a solid body of the sensor is received within a pathway of a hollow body of the sensor, the solid body contacts and breaks one or more frangible wires. The wires extend within the pathway of the hollow body of the sensor. The wires are equidistantly spaced apart along the hollow body in a direction generally parallel to a longitudinal axis of the hollow body. The wires may be spaced apart by any desired distance depending on the desired displacement measurement resolution. A data acquisition system determines a time when each wire is broken by the solid body. The data acquisition system also determines a location of each wire that is broken. From this information, the data acquisition system determines a displacement of the solid body of the sensor relative to the hollow body of the sensor. Therefore, the data acquisition system may determine the displacement of the object to which the solid body is coupled relative to the object to which the hollow body is coupled.

In one such embodiment, as illustrated in FIG. 4, the method is generally referred to by the reference numeral 400 and includes at a step 410 receiving, within a pathway of a hollow body of a sensor, a solid body of the sensor. In some embodiments, the solid body 240 is received within the pathway 230 of the hollow body 210 to allow the processor 162 to determine a displacement of the object to which the solid body 240 is coupled. As discussed above, the object may be the air vent 130. In some embodiments, the solid body 240 may be coupled to the object via the connecting member 150. In several examples, the hollow body 210 is coupled to an object to which relative displacement is to be measured. For example, it may be desirable to measure how much the air vent 130 is displaced relative to a window mount of the vehicle 110. In such examples, the air vent 130 may be coupled to the solid body 240 via the connecting member 150, and the hollow body 210 may be coupled to the window mount. The solid body 240 may be aligned with the pathway 230 such that when the air vent 130 moves relative to the hollow body 210, the solid body 240 travels within the pathway 230. Therefore, the displacement of the air vent 130 relative to the window mount, for example, may be determined.

At a step 420 during or after receiving the solid body of the sensor within the pathway of the hollow body of the sensor, the solid body breaks a frangible wire of a plurality of frangible wires as the solid body travels through the pathway. In some embodiments, the frangible wire extends from one end of the pathway 230 to another end of the pathway 230 in a direction generally perpendicular to the longitudinal axis A of the hollow body 210. In other embodiments, the wire is tensioned to allow the wire to be more easily broken by the solid body 240 as the solid body 240 travels within the pathway 230.

At a step 430 during or after the solid body breaks the frangible wire, a data acquisition system detects a first time when the wire is broken by the solid body. In some embodiments, the wire represents a completed circuit, and the processor 162 of the data acquisition system 160 may detect a signal that is output when the circuit is broken. In several examples, the time starts running when the first wire is broken. In other examples, the time starts running when the solid body 240 first moves from the initial position.

At a step 440 before, during, or after detecting the first time when the wire is broken, the data acquisition system determines a first location of the wire along the hollow body. In some embodiments, the first wire represents the initial position of the solid body 240. In such embodiments, the first wire may be 0 mm, for example, from the initial position. In several examples, because the distance I between the wires 250 is known, the data acquisition system 160 may determine the location of each successive wire after the first wire along the hollow body 210. For example, if the distance I is 5 millimeters, then the second wire will be 5 millimeters from the initial position, the third wire will be 10 millimeters from the initial position, and so on.

In several embodiments, the processor 162 of the data acquisition system 160 may determine the displacement of the solid body 240, and therefore the displacement of the object to which the solid body 240 is coupled. The data acquisition system 160 may determine the distance between the last wire broken by the solid body 240 and the first wire broken by the solid body 240. In embodiments where the first wire is the initial position, the data acquisition system determines the total displacement by determining the distance of the last wire broken by the solid body 240 from the first wire. As discussed above, the resolution of this displacement measurement is determined by the length of the distance I.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, a data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software, such as Oracle, Microsoft Access, SyBase, or DBase II, for example. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described systems, methods, and/or any combination thereof. In several embodiments, such a processor may include one or more of any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-toside," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes, and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the borrower not to invoke 35 U.S.C. § 112, paragraph 6 for any limitations of any of the claims herein, except for those in which the claim expressly uses the word "means" together with an associated function.

What is claimed is:

1. A sensor for measuring displacement and time, the sensor comprising:
    a hollow body including a longitudinal axis, the hollow body comprising:
        a wall including an inner surface and an outer surface; and
        a pathway defined by the inner surface;
    a solid body including an outer surface, the solid body configured to be received by the hollow body and travel through the pathway; and
    a plurality of frangible wires, each wire of the plurality of wires extending through a first opening in the wall, across the pathway, and through a second opening in the wall, wherein each wire is spaced apart by a distance in a direction generally parallel to the longitudinal axis of the hollow body.

2. The sensor of claim 1, wherein the solid body includes a longitudinal axis, and wherein when the solid body travels through the pathway, the longitudinal axis of the solid body is substantially aligned with the longitudinal axis of the hollow body.

3. The sensor of claim 1, wherein the outer surface of the solid body defines a diameter of the solid body, and wherein the inner surface of the hollow body defines a diameter of the pathway.

4. The sensor of claim 3, wherein the diameter of the solid body is less than the diameter of the pathway.

5. The sensor of claim 1, wherein the first and second openings in the wall extend between the outer surface of the hollow body and the inner surface of the hollow body.

6. The sensor of claim 1, wherein the solid body is configured to break at least one wire of the plurality of wires as the solid body travels through the pathway of the hollow body.

7. A system for measuring displacement and time, the system comprising:
    the sensor of claim 1; and
    a data acquisition system in communication with the plurality of wires of the sensor of claim 1, the data acquisition system comprising a processor configured to detect a first time when a first wire of the plurality of wires is broken by the solid body.

8. The system of claim 7, wherein the processor of the data acquisition system is further configured to determine a displacement of the solid body of the sensor by:
    detecting a second time when a second wire of the plurality of wires is broken by the solid body; and
    determining a distance between the first wire and the second wire.

9. The system of claim 8, wherein the processor of the data acquisition system is further configured to determine a displacement time between the first time and the second time.

10. A system for measuring displacement and time, the system comprising:
    a sensor including:
        a hollow body including a longitudinal axis, the hollow body comprising:
            a wall including an inner surface and an outer surface; and
            a pathway defined by the inner surface;
        a solid body configured to be received by the hollow body and travel through the pathway; and
        a plurality of frangible wires, each wire of the plurality of wires extending across the pathway, wherein each wire is spaced apart by a distance in a direction generally parallel to the longitudinal axis of the hollow body; and
    a data acquisition system in communication with the plurality of wires of the sensor, the data acquisition system comprising a processor configured to:
        detect a first time when a first wire of the plurality of wires is broken by the solid body as the solid body travels through the pathway; and
        detect a second time when a second wire of the plurality of wires is broken by the solid body as the solid body travels through the pathway.

11. The system of claim 10, wherein the processor of the data acquisition system is further configured to:
    determine a displacement time between the first time and the second time.

12. The system of claim 11, wherein the processor of the data acquisition system is further configured to:
    detect a first location where the first wire of the plurality of wires is broken by the solid body;
    detect a second location where the second wire of the plurality of wires is broken by the solid body; and
    determine a displacement of the solid body by computing a displacement distance between the first location and the second location.

13. The system of claim 12, wherein the processor of the data acquisition system is further configured to:
    determine a velocity of the solid body based on the displacement time and the displacement distance.

14. The system of claim 10, wherein the system further comprises:
an output device in communication with the data acquisition system.

15. The system of claim 14, wherein the processor of the data acquisition system is further configured to:
determine a displacement time between the first time and the second time;
determine a first location where the first wire of the plurality of wires is broken by the solid body;
determine a second location where the second wire of the plurality of wires is broken by the solid body; and
determine a displacement of the solid body by computing a displacement distance between the first location and the second location.

16. The system of claim 15, wherein the output device includes a display screen, and wherein the processor of the data acquisition system is further configured to:
output the determined displacement time and displacement distance to the display screen of the output device.

17. A method for measuring displacement and time, the method comprising:
receiving, within a pathway of a hollow body of a sensor, a solid body of the sensor;
breaking, by the solid body, a frangible wire of a plurality of frangible wires as the solid body travels through the pathway;
detecting, by a data acquisition system, a first time when the wire is broken by the solid body; and
determining, by the data acquisition system, a first location of the wire along the hollow body.

18. The method of claim 17, further comprising:
detecting, by the data acquisition system, a second time when a second wire of the plurality of wires is broken by the solid body; and
determining, by the data acquisition system, a second location of the second wire along the hollow body.

19. The method of claim 18, further comprising:
determining a displacement time between the first time and the second time; and
determining a displacement of the solid body by computing a displacement distance between the first location and the second location.

20. The method of claim 17, wherein breaking the wire as the solid body travels through the pathway includes breaking a circuit completed by the wire.

* * * * *